UNITED STATES PATENT OFFICE.

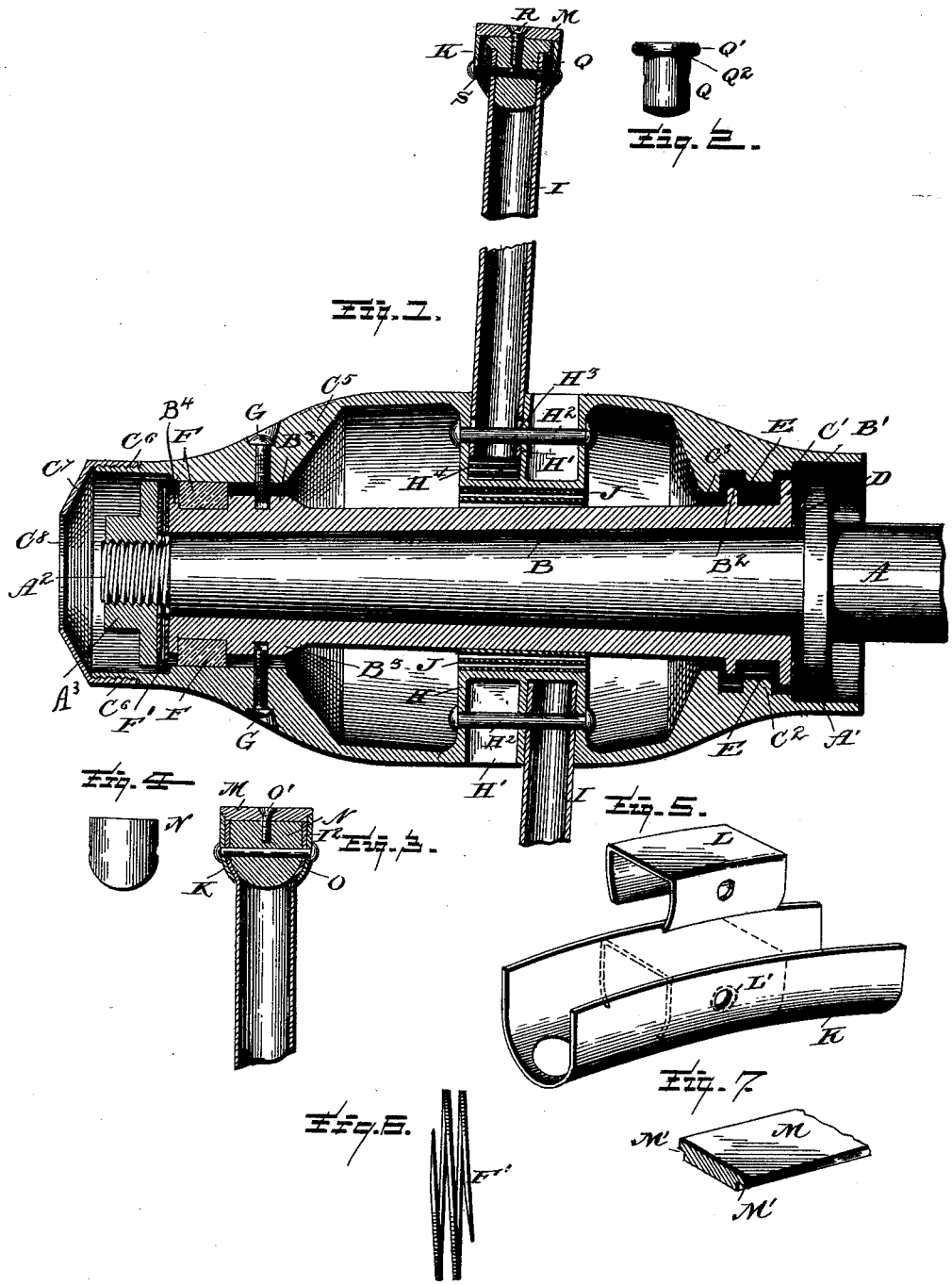

JOHN B. LOTT, OF KITTANNING, PENNSYLVANIA.

VEHICLE-WHEEL.

SPECIFICATION forming part of Letters Patent No. 415,344, dated November 19, 1889.

Application filed July 13, 1889. Serial No. 317,478. (No model.)

*To all whom it may concern:*

Be it known that I, JOHN B. LOTT, a citizen of the United States, residing at Kittanning, in the county of Armstrong and State of Pennsylvania, have invented certain new and useful Improvements in Vehicle-Wheels, of which the following is a specification, reference being had therein to the accompanying drawings.

This invention has relation to improvements in vehicle-wheels, and more particularly to the hub and sleeve or box and the means of connecting the tire to the spokes; and it has for its object, among others, to provide a simple and cheap hub of few parts, providing for increased elasticity of the parts; also, to provide for the ready attachment of the tire to the hollow spokes, as well as to prevent bending of the felly.

The novelty resides in the peculiarities of construction and the combination, arrangement, and adaptation of parts, all as hereinafter described, shown in the drawings, and then particularly pointed out in the appended claims.

The novel features will be more readily appreciated from the following description when taken in connection with the accompanying drawings, which, with the letters of reference marked thereon, form part of this specification, and in which—

Figure 1 is a longitudinal section through the hub and axle-skein, showing also one of the spokes in place, illustrating the manner of attaching the tire and felly. Fig. 2 is a side elevation of the plug employed in Fig. 1 removed. Fig. 3 is a sectional detail showing a modified form of attaching the tire and felly to the spoke. Fig. 4 is a side elevation of the plug employed in Fig. 3. Fig. 5 is an enlarged perspective detail showing a portion of the felly and the filling-block used to prevent bending or collapsing of the felly. Fig. 6 is an edge view of the steel spring employed. Fig. 7 is a perspective detail of a portion of the tire.

Like letters of reference indicate like parts throughout the several views.

Referring to the details of the drawings by letter, A designates a portion of the axle provided with an annular flange $A'$ and screw-threaded end $A^2$ to receive the nut $A^3$, all of known construction. Surrounding the end of the axle is the sleeve B, tapered to conform to the taper of the axle, and formed near each end with the annular flanges $B'$ $B^2$ and $B^3$ $B^4$, as shown in Fig. 1.

The hub C consists of a single casting of suitable exterior contour, formed near its inner end with the annular interior shoulder $C'$, which serves to limit the outward movement of the axle, a spiral spring D, preferably of steel, being placed around the axle and confined between the flange $A'$ on the axle and the flange $B'$ on the sleeve.

E is a spring encircling the sleeve and located between the flanges $B'$ $B^2$ thereof, the hub at this point being formed upon its interior with an annular flange $C^2$, designed to work between the flanges $B'$ $B^2$ of the sleeve, and serving to compress said spring when the said parts are brought in contact. The hub is also formed with the annular flange $C^3$, against which the flange $B^2$ of the sleeve may impinge to prevent endwise movement thereof.

The flanges $B'$, $B^2$, and $C^2$ are so proportioned with relation to each other, as shown in Fig. 1, that the flange $C^2$ will not interfere with the removal of the hub from the axle when desired, and will serve to limit endwise movement in the opposite direction. Near its outer end the hub is formed interiorly with a thickened portion $C^5$, to materially strengthen the same at this point and to receive the set-screws hereinafter described. Confined within the flanges $B^3$ $B^4$ of the sleeve, and having impact against the thickened portion $C^5$ of the hub, is the elastic spring F, preferably of rubber. The flange $B^3$ is extended, as shown in Fig. 1, to form sufficient substance for sockets, which are screw-threaded to receive the set-screws hereinafter referred to. The outer end of the hub is screw-threaded, as shown at $C^6$, to receive a screw-threaded cap $C^7$, which may be of any ornamental material, being provided with suitable apertures to receive a suitable instrument for removing the nut, which, when removed, will be retained in the pocket at the end of the hub, thus preventing loss or misplacement of the same. Between the flange $B^4$ of the sleeve and the flange of the nut is a spring $F'$, preferably of steel, the preferred form being shown in Fig. 6.

G are set-screws passed through suitable screw-threaded openings in the thickened portion $C^5$ and into the screw-threaded sockets of the sleeve above referred to, as seen in Fig. 1. These serve to hold the parts in position, and by simply loosening the screws so as to disengage them from the sockets, the wheel is free to be withdrawn from the axle.

The hub is formed substantially at its longitudinal center with the interior disk H, having spoke-receiving sockets H', in which are seated the inner ends of the spokes I, the spokes I employ being preferably hollow or tubular, as shown, and are retained in their sockets by means of suitable bolts or rivets $H^2$, which pass through suitable openings in the spoke, the spokes shown in the upper portion of Fig. 1 being shown as provided with an elongated slot $H^3$, to allow a little play of the spoke, a suitable spring $H^4$ being provided between the inner end of the spoke and the inner periphery of the disk, as shown. The spoke at the lower portion of Fig. 1 is shown as not being provided with this spring, and I may sometimes choose to so arrange the parts; but I prefer the use of the spring, as it affords considerable elasticity.

Between the sleeve and the inner end of the spoke-socket disk is a spring J, which may be employed in connection with the spring $H^4$ at the inner edge of the spoke or not, although preferably when I employ one the other is omitted.

The fellies that I preferably employ are substantially U-shaped, as shown at K in Fig. 5, provided with suitable apertures to receive the outer end of the spokes, and to prevent the bending of this felly I employ a filling-piece, as shown at L in Fig. 5, formed with a flat face and inwardly-curved sides to conform to the curvature of the inner walls of the felly. This filling-piece is placed in the felly, as indicated in dotted lines in Fig. 5, and retained therein by means of the transverse pin or bolt L', as clearly shown in said figure. These filling-pieces are employed between the spokes, and may be of suitable length to occupy the whole or less than the whole of the space between said spokes.

M is the tire, which upon its inner face is formed with the shoulder M', forming a channel, which is designed to receive the outer edges of the felly, as shown more clearly in Fig. 3, to prevent pressing in thereof, the spokes in this figure being shown as having upturned ends $I^2$, which have a bearing against the inner wall of the felly, with their outer edges bearing against the inner face of the tire, a plug N being employed, which fits within the ends of the spoke, the whole being retained in place by means of the transverse bolt or pin O, as clearly shown in Fig. 3, the screw O' also being employed, which passes through a suitable hole in the tire into the plug N at right angles to the bolt O. This construction holds the bolts firmly together and prevents spreading of the felly.

Instead of employing the devices shown in Figs. 3 and 4, I sometimes connect the spokes, felly, and tire as shown at the top of Fig. 1, in which the end of the spoke is passed through the felly and receives a plug Q, of suitable material, having a flange Q', providing a flat shoulder $Q^2$, which bears on the end of the spoke, the plug fitting within the spoke and provided with a rounded bottom to conform to the shape of the felly. In this form I employ a flat tire, which rests firmly against the end of the felly, and is secured in place by means of a screw R, passing through a hole in the tire and engaging the screw-threads of the plug. A transverse bolt or rivet S passes through the felly, spoke, and plug, and serves to retain the parts in position. In this instance the flange Q' of the plug Q serves the same purpose as the shoulders M' of the form of tire employed in Fig. 3, and the construction shown in Fig. 1 serves to prevent effectually any play of the tire upon the felly or spokes.

A vehicle-wheel constructed as above described has been found from actual practice to be far superior to all prior forms, providing elasticity at all parts where necessary.

What I claim is—

1. The combination, with the sleeve having annular flanges B' and $B^2$, of the hub formed with an interior annular flange $C^2$ between the flanges B' and $B^2$, and with a flange $C^3$, flanges B' and $B^2$ being of different lengths, with the longer one innermost, and the flanges on the hub being of different lengths, with the longer one outermost, substantially as shown and described, and for the purpose specified.

2. The combination, with the axle, sleeve, and hub, of the spring E, surrounding the sleeve and confined between the flanges thereon, the said hub being formed with an interior flange arranged opposite said spring, substantially as described.

3. The combination, with the hub formed with interior spoke-receiving sockets, of the spokes fitted in said sockets and having slight endwise play therein, and the transverse bolts passed through the walls of the sockets within the hub and through elongated slots in the spokes and serving to limit the play of the spokes within their sockets, substantially as described.

4. The combination, with the hub formed with interior spoke-receiving sockets, of the spokes fitted in said sockets and having slight endwise play therein, the transverse bolts passed through the walls of the sockets and through elongated holes in the spokes, and the spring within the sockets between the bottom thereof and the lower ends of the spokes, substantially as described.

5. The combination, with the substantially U-shaped felly, of the filling-block, of substantially reverse shape to that of the felly and secured therein between the spoke-sockets, and having inwardly-curved sides, substantially as and for the purpose specified.

6. The combination, with the axle and the sleeve formed with flanges $B'$, $B^2$, $B^3$, and $B^4$, of the hub formed with interior flange $C^2$, the spring E between the flanges $B'$ $B^2$, the spring between the flanges $B^3$ $B^4$, and the springs at the ends of the sleeve, substantially as shown and described.

7. The combination, with the hollow spoke, the plug fitted therein, the substantially-U-shaped felly, and the tire, of the transverse bolt passed through the felly, spoke, and plug, and the screw passed through the tire and into the plug at right angles to said bolt, substantially as shown and described.

8. The combination, with the axle, the sleeve, and the hub formed with inwardly-extending spoke-sockets, of the spokes, the springs within the sockets behind the inner ends of the spokes, and the springs encircling the sleeve between the same and the spoke-sockets, substantially as shown and described.

In testimony whereof I affix my signature in presence of two witnesses.

JOHN B. LOTT.

Witnesses:
E. H. BOND,
HEATH SUTHERLAND.